(12) United States Patent
Yano et al.

(10) Patent No.: US 6,956,732 B1
(45) Date of Patent: Oct. 18, 2005

(54) SOLID ELECTROLYTIC CAPACITOR AND A FABRICATION METHOD THEREFOR

(75) Inventors: Mutsumi Yano, Hirakata (JP); Kazuhiro Takatani, Takatsuki (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 17 days.

(21) Appl. No.: 11/032,076

(22) Filed: Jan. 11, 2005

(30) Foreign Application Priority Data

Mar. 31, 2004 (JP) ............................. 2004-104843

(51) Int. Cl.[7] .......................... H01G 4/06; H01G 5/013

(52) U.S. Cl. ...................................... 361/524; 29/25.03
(58) Field of Search .............................. 361/324, 523, 361/525–541

(56) References Cited

U.S. PATENT DOCUMENTS

| 2003/0147203 A1 * | 8/2003 | Naito et al. ................... 361/524 |
| 2004/0016978 A1 * | 1/2004 | Yano et al. ................... 257/397 |
| 2004/0085707 A1 * | 5/2004 | Yano et al. ................... 361/302 |

FOREIGN PATENT DOCUMENTS

| JP | 05-121275 | 5/1993 |
| JP | 11-312628 | 11/1999 |

* cited by examiner

*Primary Examiner*—Eric W. Thomas
(74) *Attorney, Agent, or Firm*—McDermott Will & Emery LLP

(57) ABSTRACT

A solid electrolytic capacitor of the present invention is provided with: an anode employing titanium; a dielectric layer formed on said anode, which comprises titanium oxide containing fluorine and at least one element selected from a group consisting of phosphorus, boron, sulfur, and tungsten; and a cathode layer formed on said dielectric layer.

6 Claims, 2 Drawing Sheets

F i g . 3
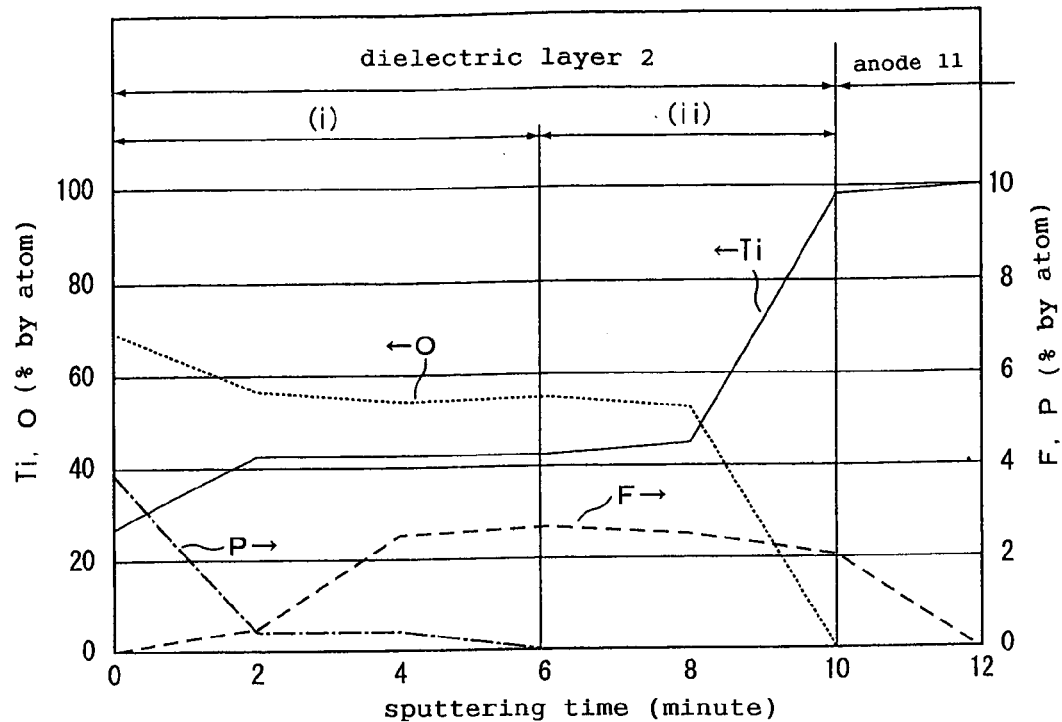

SOLID ELECTROLYTIC CAPACITOR AND A FABRICATION METHOD THEREFOR

RELATED APPLICATION

The priority application(s) Number(s) Japanese Patent Application No. 2004-104843 upon which this patent application is based is hereby incorporated by reference.

BACKGROUND OF THE INVENTION

1. Field of the Invention

The present invention relates to a solid electrolytic capacitor and a fabrication method therefor.

2. Description of the Related Art

Solid electrolytic capacitors provided with a dielectric layer of titanium oxide having a dielectric constant about 5 times as large as aluminum oxide have been well-known (JP-A-5-121275 and JP-A-11-312628).

In fabrication of the solid electrolytic capacitors provided with the dielectric layer of titanium oxide, an anode employing titanium metal plates or of sintered bodies of titanium powder is anodized.

However, in the above-mentioned solid electrolytic capacitors provided with the dielectric layer of titanium oxide prepared by anodizing the anode of the titanium metal plates or of the sintered bodies of titanium powder, there have remained problems that titanium oxide is easily crystallized in a process of the anodic oxidation, consequently, the electrical insulation of the dielectric layer decreases and leakage current between an anode and a cathode layer increases.

SUMMARY OF THE INVENTION

A first object of the present invention is to decrease leakage current between an anode and a cathode layer in a solid electrolytic capacitor provided with a dielectric layer of titanium oxide prepared by anodizing the anode.

Another object of the invention is to provide a fabrication method of the solid electrolytic capacitor with less leakage current between the anode and the cathode layer.

A solid electrolytic capacitor according to the present invention is provided with: an anode employing titanium; a dielectric layer formed on said anode, which comprises titanium oxide containing fluorine and at least one element selected from a group consisting of phosphorus, boron, sulfur, and tungsten; and a cathode layer formed on the dielectric layer.

When the dielectric layer of titanium oxide contains fluorine and at least one element selected from the group consisting of phosphorus, boron, sulfur, and tungsten as in the solid electrolytic capacitor of the present invention, crystallization of titanium oxide which occurs in a process of anodic oxidation of the anode is well-controlled.

Consequently, in the solid electrolytic capacitor of the present invention, decrease of the electrical insulation of the dielectric layer is obviated and the leakage current between the anode and the cathode layer decreases.

In the solid electrolytic capacitor of the present invention, concentration of at least one element selected from the group consisting of phosphorus, boron, sulfur, and tungsten is preferably set to be higher in a cathode layer side of the dielectric layer than an anode side of the dielectric layer. The crystallization of titanium oxide on the cathode layer side which is a surface side of the dielectric layer is further controlled by such a composition, therefore, volume change caused by the crystallization of titanium oxide on the cathode layer side of the dielectric layer is controlled. Consequently, occurrence of cracks on the surface of the dielectric layer is prevented and the decrease of the electrical insulation of the dielectric layer is further obviated.

In the solid electrolytic capacitor of the present invention, an insufficient thickness of the dielectric layer results in the insufficient electrical insulation whereas an excessive thickness of the dielectric layer results in the decrease of the electrical insulation of the dielectric layer because of the necessity of long time for the anodic oxidation to form the dielectric layer and the progress of the crystallization of titanium oxide which occurs in the process of the anodic oxidation. Therefore, the thickness of the dielectric layer is preferably in a range of 4 nm to 20 nm and, more preferably, in the range of 6 nm to 15 nm. When the thickness of the dielectric layer is within the above-mentioned range, the electrical insulation of the dielectric layer sufficiently increases.

A fabrication method of a solid electrolytic capacitor of the present invention comprises steps of: forming a dielectric layer by anodizing an anode employing titanium; and forming a cathode layer on said dielectric layer; wherein said step of forming the dielectric layer comprises: a first step of anodizing the anode in an aqueous solution containing fluoride ion; and a second step of anodizing the anode after the first step in the aqueous solution containing at least one ion selected from a group consisting of phosphate ion, borate ion, sulfate ion, and tungstate ion.

In the fabrication method of the solid electrolytic capacitor of the present invention, a first anodically oxidized film of titanium oxide containing fluorine is formed on the anode employing titanium as a result of the first step of forming the dielectric layer. In addition, a second anodically oxidized film of titanium oxide containing at least one element selected from the group consisting of phosphorus, boron, sulfur, and tungsten is formed as a result of the second step. Consequently, the dielectric layer comprising the first anodically oxidized film and the second anodically oxidized film, which are successively layered is formed on the anode employing titanium.

Fluorine contained in the first anodically oxidized film easily diffuses, therefore, the second anodically oxidized film also contains fluorine by formation of the second anodically oxidized film on the first anodically oxidized film.

On the other hand, at least one element selected from the group consisting of phosphorus, boron, sulfur, and tungsten hardly diffuses, therefore, concentration of said elements in the dielectric layer comprising the first anodically oxidized film and the second anodically oxidized film is higher in a cathode layer side of the second anodically oxidized film than an anode side of the first anodically oxidized film.

Consequently, the dielectric layer of titanium oxide comprising the first anodically oxidized film and the second anodically oxidized film contains fluorine and at least one element selected from the group consisting of phosphorus, boron, sulfur, and tungsten. As a result, the crystallization of titanium oxide is controlled and the decrease of the electrical insulation of the dielectric layer is obviated.

In addition, the concentration of at least one element selected from the group consisting of phosphorus, boron, sulfur, and tungsten is higher in the cathode layer side of the dielectric layer, therefore, the crystallization of titanium oxide on the cathode layer side which is the surface side of the dielectric layer is further controlled. Consequently, volume change caused by the crystallization of titanium oxide on the cathode layer side of the dielectric layer is controlled. Therefore, occurrence of cracks on the surface of the dielectric layer is prevented and the decrease of the electrical insulation of the dielectric layer is further obviated.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 3 is an illustration showing measurement results of an anode and a dielectric layer of the solid electrolytic capacitor of Example 1 of the present invention by ESCA.

DESCRIPTION OF THE PREFERRED EMBODIMENTS

Hereinafter, preferred embodiments of the present invention will specifically be described based on the attached figures. It is to be noted that the present invention should not be limited to the following examples thereof and suitable changes and modifications may be made thereto within the scope of the invention.

Figure 1:
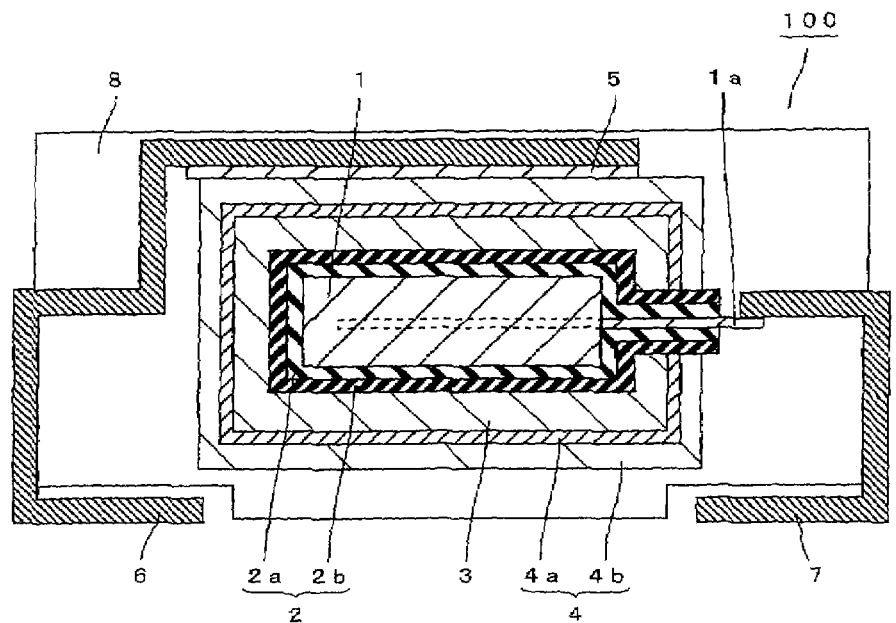
FIG. 1 is a structural cross-sectional view of a solid electrolytic capacitor of an embodiment of the present invention.

FIG. 1 is a structural cross-sectional view of a solid electrolytic capacitor of an embodiment of the present invention.

In a solid electrolytic capacitor 100 of the embodiment, as shown in FIG. 1, a dielectric layer 2 of titanium oxide containing fluorine is formed on a surface of a plate-shaped anode of a porous sintered body prepared by sintering and molding titanium particles around an anode lead 1$a$ in a vacuum environment.

The dielectric layer 2 comprises a first anodically oxidized film 2$a$ at an anode 1 side and a second anodically oxidized film 2$b$ at a cathode layer 4 side. The second anodically oxidized film 2$b$ contains fluorine and at least one element selected from a group consisting of phosphorus, boron, sulfur, and tungsten.

An electrolyte layer 3 is formed on the dielectric layer 2. The electrolyte layer 3 comprises manganese dioxide or conducting polymer including polypyrrole and polyaniline.

A cathode layer 4 is formed on the electrolyte layer 3. The cathode layer 4 comprises a first conductive layer 4$a$ of carbon paste or the like formed on the electrolyte layer 3 and a second conductive layer 4$b$ of silver paste or the like formed on the first conductive layer 4$a$.

A cathode terminal 6 is installed on the cathode layer 4 by conductive adhesive 5 and an anode terminal 7 is installed to an anode lead 1$a$ of said anode 1.

One end of the anode terminal 7 and that of the cathode terminal 6 are thrust outside a mold outer resin 8.

A fabrication method of the solid electrolytic capacitor will be specified hereinafter.

Titanium particles are sintered and molded around the anode lead 1$a$ in the vacuum environment to obtain a plate-shaped anode 1 of a porous sintered body prepared by welding the titanium particles.

Next, in formation of the dielectric layer 2 on the anode 1, the anode 1 is anodized in an aqueous solution containing fluoride ion including ammonium fluoride aqueous solution as a first step. As a result, the first anodically oxidized film 2$a$ of titanium oxide containing fluorine is formed on the anode 1.

Further, the anode 1 is anodized in at east one aqueous solution selected from the aqueous solution containing phosphate ion including ammonium dihydrogen phosphate aqueous solution, the aqueous solution containing borate ion including ammonium borate aqueous solution, the aqueous solution containing sulfate ion including sulfate aqueous solution, and the aqueous solution containing tungstate ion including sodium tungstate aqueous solution as a second step. As a result, the second anodically oxidized film 2$b$ of titanium oxide containing at least one element selected from phosphorus, boron, sulfur, and tungsten is formed on the first anodically oxidized film 2$a$.

Thus, the dielectric layer 2 comprising the first anodically oxidized film 2$a$ and the second anodically oxidized film 2$b$, which are layered successively is formed on the surface of the anode 1.

The second anodically oxidized film 2$b$ also contains fluorine when the second anodically oxidized film 2$b$ is formed by the second step because fluorine contained in the first anodically oxidized film 2$a$ easily diffuses to the second anodically oxidized film 2$b$. On the other hand, at least one element selected from phosphorus, boron, sulfur, and tungsten contained in the second anodically oxidized film 2$b$ hardly diffuses to the first anodically oxidized film 2$a$, therefore, concentration of said elements in the dielectric layer 2 comprising the first anodically oxidized film 2$a$ and the second anodically oxidized film 2$b$ is higher in the cathode layer side of the second anodically oxidized film 2$b$ than the anode side of the first anodically oxidized film 2$a$.

In addition, an electrolyte layer 3 of manganese dioxide or conducting polymer including polypyrrole and polyaniline is formed on the dielectric layer 2. Various polymerization processes can be applied to form the electrolyte layer 3 of the conducting polymer whereas pyrolysis can be applied to form the electrolyte layer 3 of manganese dioxide. When the electrolyte layer 3 is formed by the above-mentioned manner, the electrolyte layer 3 fills up chinks of the dielectric layer 2 on the surface of the porous sintered body as the anode 1.

Moreover, the first conductive layer 4$a$ is formed by applying carbon paste or the like on the electrolyte layer 3 and the second conductive layer 4$b$ is formed by applying silver paste or the like on the first conductive layer 4$a$ so as to form the cathode layer 4 comprising the first conductive layer 4$a$ and the second conductive layer 4$b$.

The cathode terminal 6 is installed on the cathode layer 4 by the conductive adhesive 5 and the anode terminal 7 is installed to the anode lead 1$a$ salient from the dielectric layer 2, the electrolyte layer 3, and the cathode layer 4. Furthermore, one end of the anode terminal 7 and that of the cathode terminal 6 are thrust outside the mold outer resin 8.

In the solid electrolytic capacitor 100 of the embodiment, the dielectric layer 2 of titanium oxide formed on the anode 1 contains fluorine and at least one element selected from the group consisting of phosphorus, boron, sulfur, and tungsten, therefore, crystallization of titanium oxide is well-controlled. Consequently, decrease of the electrical insulation of the dielectric layer 2 caused by the crystallization of titanium oxide is obviated and leakage current between the anode 1 and the cathode layer 4 decreases.

In the solid electrolytic capacitor 100 of the embodiment, the concentration of the at least one element selected from the group consisting of phosphorus, boron, sulfur, and tungsten is higher in the cathode layer side of the second anodically oxidized film 2b than the anode side of the first anodically oxidized film 2a. The crystallization of titanium oxide on the cathode layer 4 side which is a surface side of the dielectric layer is further controlled by such a composition, therefore, volume change caused by the crystallization of titanium oxide on the cathode layer side of the dielectric layer is controlled. Consequently, occurrence of cracks on the surface of the dielectric layer 2 is prevented and the decrease of the electrical insulation of the dielectric layer 2 is further obviated.

In the embodiment, in the formation of the dielectric layer 2 on the anode 1, the first anodically oxidized film 2a of titanium oxide containing fluorine is formed on the anode 1 by anodic oxidation first and the second anodically oxidized film 2b of titanium oxide containing at least one element selected from the group consisting of phosphorus, boron, sulfur, and tungsten is formed by the anodic oxidation secondly. Consequently, the dielectric layer 2 containing fluorine and at least one element selected from the group consisting of phosphorus, boron, sulfur, and tungsten is formed and the concentration of at least one element selected from the group consisting of phosphorus, boron, sulfur, and tungsten is easily set to be higher in the cathode layer 4 side of the dielectric layer 2.

Consequently, the crystallization of titanium oxide in the dielectric layer 2 is controlled and the occurrence of the cracks on the surface of the dielectric layer 2 is prevented so as to easily fabricate the solid electrolytic capacitor 100 provided with the dielectric layer 2 with an increased electrical insulation.

In the embodiment, there was used the plate-shaped anode 1 of the porous sintered body. The anode 1, however, is not limited to said shape but may be a rod-shaped anode or a foil-shaped anode. The anode 1 may also be the plate-shaped anode or the foil-shaped anode respectively prepared by casting and rolling or the like.

In addition, in the embodiment, the electrolyte layer 3 is formed between the dielectric layer 2 and the cathode layer 4. The formation of the electrolyte layer 3, however, may be omitted and the cathode layer 4 may directly be formed on the dielectric layer 2.

Hereinafter, a solid electrolytic capacitor of examples of the present invention will specifically be described while comparative examples will be cited to demonstrate that examples of the inventive electrolytic capacitor decrease leakage current.

EXAMPLE 1

Figure 2:
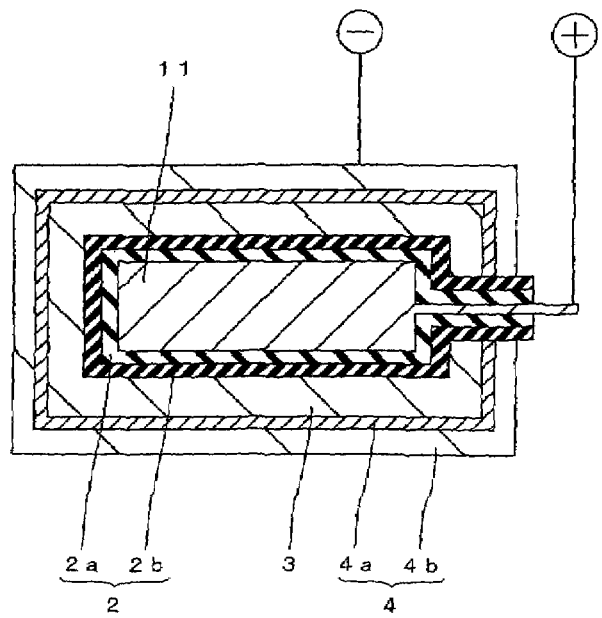
FIG. 2 is an illustration showing a structure and an evaluation method of a solid electrolytic capacitor of Example 1 of the present invention.

FIG. 2 is an illustration showing a structure and an evaluation method of a solid electrolytic capacitor of Example 1 of the present invention.

In fabrication of the solid electrolytic capacitor of Example 1, an anode 11 of plate-shaped titanium substrate about 50 mm long, 10 mm wide, and about 100 $\mu$m thick prepared by casting and rolling or the like was formed.

Next, in formation of the dielectric layer 2 on the anode 11, the anode 11 was anodized at a constant voltage of about 5 V in an aqueous solution containing about 0.1 wt % of ammonium fluoride (concentration of fluoride ion: about 0.05 wt %) at about 50° C. for about 30 minutes as the first step to form a first anodically oxidized film 2a of titanium oxide containing fluorine on the anode 11. The ammonium fluoride aqueous solution is an example of the aqueous solution containing fluoride ion.

Further, the anode 11 was anodized at the constant voltage of about 5 V in the aqueous solution containing about 0.1 wt % of ammonium dihydrogen phosphate at about 50° C. for about 30 minutes to form the second anodically oxidized film 2b on the first anodically oxidized film 2a.

The ammonium dihydrogen phosphate aqueous solution is an example of the aqueous solution containing phosphate ion.

Thus, the dielectric layer 2 comprising the first anodically oxidized film 2a and the second anodically oxidized film 2b having total thickness of about 10 nm was formed on the anode 11.

The dielectric layer 2 comprising the first anodically oxidized film 2a and the second anodically oxidized film 2b formed on the anode 11 was analyzed by ESCA (Electron Spectroscopy for Chemical Analysis). The results are shown in FIG. 3. In FIG. 3, vertical axes show content of elements in the capacitor and horizontal axes show sputtering time. The sputtering time corresponds to a position in thickness direction and sputtering depth per minute of the sputtering time is about 1 nm.

As shown in FIG. 3, distribution of oxygen (O) confirms that the dielectric layer 2 of titanium oxide containing titanium (Ti) and oxygen (O), having the thickness of about 10 nm was formed on the anode 11. In FIG. 3, the region on a right side of the dielectric layer 2, in which oxygen (O) hardly exists is anode 11.

In addition, FIG. 3 shows that the dielectric layer 2 comprises the region (i) about 6 nm thick which contains fluorine (F) and phosphorus (P) on a surface side (cathode layer 4 side) and the region (ii) about 4 nm thick which contains fluorine (F) but does not contain phosphorus (P) on an anode 11 side. Therefore, it was confirmed that the region (i) was the second anodically oxidized film 2b formed in the above-mentioned second step and the region (ii) was the first anodically oxidized film 2a formed in the above-mentioned first step.

Further, about 3% by atom of fluorine (F) was contained in the interior of the region (ii), therefore, fluorine (F) expectedly diffused in the region (i). It was also confirmed that the concentration of phosphorus (P) of the region (i) was highest (about 4% by atom) on the surface side (cathode layer 4 side) and the concentration gradually decreased in the interior.

Moreover, an electrolyte layer 3 of polypyrrole was formed on the dielectric layer 2 by electrolytic polymerization. Furthermore, carbon paste was applied on the electrolyte layer 3 to form a first conductive layer 4a and silver paste was applied on the first conductive layer 4a to form a second conductive layer 4b so as to form the cathode layer 4 comprising the first conductive layer 4a and the second conductive layer 4b on the electrolyte layer 3. Thus was fabricated the solid electrolytic capacitor A of Example 1.

COMPARATIVE EXAMPLE 1

In comparative example 1, in the anodic oxidation of the anode 11 of the plate-shaped titanium substrate, time for the anodic oxidation according to the first step of Example 1 was changed to 60 minutes and the second step of was not carried. Except for the above, the same procedure as that in Example 1 was taken to fabricate the solid electrolytic capacitor X of comparative example 1, in which the dielectric layer comprising only the first anodically oxidized film having the thickness of about 10 nm was formed on the anode.

As a result of measurement of the dielectric layer comprising the first anodically oxidized film formed on the anode by ESCA, it was confirmed that fluorine was contained in the dielectric layer whereas phosphorus was not contained in the dielectric layer.

COMPARATIVE EXAMPLE 2

In comparative example 2, in the anodic oxidation of the anode 11 of the plate-shaped titanium substrate, the first step of Example 1 was not carried out and the time for the anodic oxidation according to the second step was changed to 60 minutes. Except for the above, the same procedure as that in Example 1 was taken to fabricate the solid electrolytic capacitor Y of comparative example 2, in which the dielectric layer comprising only the second anodically oxidized film having the thickness of about 10 nm was formed on the anode.

As a result of the measurement of the dielectric layer comprising the second anodically oxidized film formed on the anode by ESCA, it was confirmed that phosphorus was contained in the dielectric layer whereas fluorine was not contained in the dielectric layer.

The constant voltage of about 2.5 V was applied between the anode 11 and the cathode layer 4 of the resultant solid electrolytic capacitors A, X, and Y of Example 1, comparative examples 1, and 2 so as to determine the respective leakage current after about 20 seconds. An index number of the leakage current of each of the solid electrolytic capacitors was determined on a basis of the leakage current of the solid electrolytic capacitor of Example 1 defined as 100. The results are listed in Table 1 as below.

TABLE 1

|  | leakage current |
|---|---|
| solid electrolytic capacitor A | 100 |
| solid electrolytic capacitor X | 700 |
| solid electrolytic capacitor Y | 1000 |

As is apparent from the results, the leakage current of the solid electrolytic capacitor A of Example 1 provided with the dielectric layer containing fluorine and phosphorous decreased so notably as to about 1/7 compared with the solid electrolytic capacitor X of comparative example 1 provided with the dielectric layer which contained fluorine but did not contain phosphorus, and to about 1/10 compared with the solid electrolytic capacitor Y of comparative example 2 provided with the dielectric layer which contained phosphorus but did not contain fluorine.

EXAMPLE 2

In Example 2, in the anodic oxidation of the anode 11 of the plate-shaped titanium substrate, the aqueous solution containing about 0.1 wt % of ammonium borate was used in place of the aqueous solution containing about 0.1 wt % of ammonium dihydrogen phosphate used in the second step of Example 1. Except for the above, the same procedure as that in Example 1 was used to fabricate the solid electrolytic capacitor Al. The ammonium borate aqueous solution is an example of the aqueous solution containing borate ion.

As a result of a composition analysis of the dielectric layer of Example 2 by ESCA in the same manner as in Example 1, it was confirmed that the dielectric layer having the thickness of about 10 nm was formed on the anode employing titanium and that the dielectric layer formed on the anode comprised the first anodically oxidized film of titanium oxide containing fluorine and the second anodically oxidized film of titanium oxide containing fluorine and boron, which were successively layered.

EXAMPLE 3

In Example 3, in the anodic oxidation of the anode 11 of the plate-shaped titanium substrate, the aqueous solution containing about 0.1 wt % of ammonium tungstate was used in place of the aqueous solution containing about 0.1 wt % of ammonium dihydrogen phosphate used in the second step of Example 1. Except for the above, the same procedure as that in Example 1 was used to fabricate the solid electrolytic capacitor A2. The ammonium tungstate aqueous solution is an example of the aqueous solution containing tungstate ion.

As a result of the composition analysis of the dielectric layer of Example 3 by ESCA in the same manner as in Example 1, it was confirmed that the dielectric layer having the thickness of 10 nm was formed on the anode employing titanium and that the dielectric layer formed on the anode comprised the first anodically oxidized film of titanium oxide containing fluorine and the second anodically oxidized film of titanium oxide containing fluorine and tungsten, which were successively layered.

EXAMPLE 4

In Example 4, in the anodic oxidation of the anode 0.11 of the plate-shaped titanium substrate, the aqueous solution containing about 0.1 wt % of sulfate was used in place of the aqueous solution containing about 0.1 wt % of ammonium dihydrogen phosphate used in the second step of Example 1. Except for the above, the same procedure as that in Example 1 was used to fabricate the solid electrolytic capacitor A3. The sulfate aqueous solution is an example of the aqueous solution containing sulfate ion.

As a result of the composition analysis of the dielectric layer of Example 4 by ESCA in the same manner as in Example 1, it was confirmed that the dielectric layer having the thickness of 10 nm was formed on the anode employing titanium and that the dielectric layer formed on the anode comprised the first anodically oxidized film of titanium oxide containing fluorine and the second anodically oxidized film of titanium oxide containing fluorine and sulfur, which were successively layered.

EXAMPLE 5

In Example 5, in the anodic oxidation of the anode 11 of the plate-shaped titanium substrate, the aqueous solution containing mixture of about 0.1 wt % of ammonium dihydrogen phosphate aqueous solution and about 0.1 wt % of tungstate aqueous solution in a ratio of 1:1 was used in place of the aqueous solution containing about 0.1 wt % of ammonium dihydrogen phosphate used in the second step of Example 1. Except for the above, the same procedure as that in Example 1 was used to fabricate the solid electrolytic capacitor A4.

As a result of the composition analysis of the dielectric layer of Example 4 by ESCA in the same manner as in Example 1, it was confirmed that the dielectric layer having the thickness of 10 nm was formed on the anode employing titanium and that the dielectric layer formed on the anode comprised the first anodically oxidized film of titanium oxide containing fluorine and the second anodically oxidized film of titanium oxide containing fluorine, phosphorus, and tungsten, which were successively layered.

In the same manner as in Example 1, the constant voltage of about 2.5 V was applied between the anode 11 and the cathode layer 4 of the resultant solid electrolytic capacitors A1 to A4 of Examples 2 to 5 so as to determine the respective leakage current after about 20 seconds. The index number of leakage current of each of the solid electrolytic capacitors was determined on the basis of the leakage current of the solid electrolytic capacitor of Example 1 defined as 100. The results are listed in Table 2 as below.

TABLE 2

| | leakage current |
|---|---|
| solid electrolytic capacitor A | 100 |
| solid electrolytic capacitor A1 | 150 |
| solid electrolytic capacitor A2 | 102 |
| solid electrolytic capacitor A3 | 120 |
| solid electrolytic capacitor A4 | 110 |

As is apparent from the results, the leakage current of the solid electrolytic capacitors A1 to A4 of Examples 2 to 5 decreased so notably compared with the solid electrolytic capacitors X and Y of comparative examples 1 and 2.

As a result, it was confirmed that the leakage current decreases so notably when the solid electrolytic capacitor contains fluorine and at least one element selected from the group consisting of phosphorus, boron, sulfur, and tungsten.

In addition, in order to decrease the leakage current, Table 2 also confirms that at least one of phosphorus and tungsten is preferably contained in the second anodically oxidized film 2 of the dielectric layer and, more preferably, one of phosphorus and tungsten is contained.

EXAMPLE 6

In Example 6, relation between the thickness of the dielectric layer and the leakage current was examined.

In Example 6, in the formation of the dielectric layer 2 on the anode 11 in the fabrication of the solid electrolytic capacitor A of Example 1, the voltage applied for the anodic oxidation in the first step and the second step was changed respectively to about 1 V, about 2 V, about 3 V, about 7.5 V, about 10 V, and about 12.5 V. Except for the above, the same procedure as that in Example 1 was used to fabricate the solid electrolytic capacitors B1 to B6.

As a result of the composition analysis of the dielectric layers of each of the solid electrolytic capacitors B1 to B6 by ESCA in the same manner as in Example 1, it was confirmed that the dielectric layer comprising the first anodically oxidized film of titanium oxide containing fluorine and the second anodically oxidized film of titanium oxide containing fluorine, which were layered successively was formed on the anode employing titanium in each of the solid electrolytic capacitors and that the thickness of the dielectric layers of the solid electrolytic capacitors B1 to B6 was respectively about 2 nm, about 4 nm, about 6 nm, about 15 nm, about 20 nm, and about 25 nm.

Then, about half constant voltages of the above-mentioned constant voltages applied for the anodic oxidation, especially about 0.5 V, about 1 V, about 1.5 V, about 3.2 V, about 5 V, and about 6.3 V, was respectively applied between the anode 11 and the cathode layer 4 of each of the resultant solid electrolytic capacitors B1 to B6 so as to determine the respective leakage current after about 20 seconds. The index number of leakage current of each of the solid electrolytic capacitors was determined on the basis of the leakage current of the solid electrolytic capacitor of Example 1 defined as 100. The results are listed in Table 3 as below.

TABLE 3

| | thickness of dielectric layer (nm) | leakage current |
|---|---|---|
| solid electrolytic capacitor B1 | 2 | 550 |
| solid electrolytic capacitor B2 | 4 | 130 |
| solid electrolytic capacitor B3 | 6 | 102 |
| solid electrolytic capacitor A | 10 | 100 |
| solid electrolytic capacitor B4 | 15 | 104 |
| solid electrolytic capacitor B5 | 20 | 125 |
| solid electrolytic capacitor B6 | 25 | 500 |

As is apparent from the results, the leakage current of the solid electrolytic capacitors B1 to B6 of Example 6 decreased so notably compared with the solid electrolytic capacitors X and Y of comparative examples 1 and 2.

It was also confirmed that, in order to decrease the leakage current, the thickness of the dielectric layer is preferably in the range of 4 nm to 20 nm and, more preferably, in the range of 6 nm to 15 nm.

Although the present invention has been fully described by way of examples, it is to be noted that various changes and modifications will be apparent to those skilled in the art.

Therefore, unless otherwise such changes and modifications depart from the scope of the invention, they should be construed as being included therein.

What is claimed is:

1. A solid electrolytic capacitor provided with:
   an anode employing titanium;
   a dielectric layer formed on said anode, which comprises titanium oxide containing fluorine and at least one element selected from a group consisting of phosphorus, boron, sulfur, and tungsten;
   and a cathode layer formed on said dielectric layer.

2. The solid electrolytic capacitor as claimed in claim 1, wherein
   concentration of at least one element selected from the group consisting of phosphorus, boron, sulfur, and tungsten is higher in a cathode layer side of said dielectric layer than an anode side of said dielectric layer.

3. The solid electrolytic capacitor as claimed in claim 1, wherein
   thickness of said dielectric layer is in a range of 4 nm to 20 nm.

4. The solid electrolytic capacitor as claimed in claim 1, wherein
   an electrolyte layer is formed between said dielectric layer and the cathode layer.

5. A fabrication method of a solid electrolytic capacitor comprising steps of:
   forming a dielectric layer by anodizing an anode employing titanium; and
   forming a cathode layer on said dielectric layer; wherein said step of forming the dielectric layer comprises: a first step of anodizing said anode in an aqueous solution containing fluoride ion; and a second step of anodizing the anode after the first step in the aqueous solution containing at least one ion selected from a group consisting of phosphate ion, borate ion, sulfate ion, and tungstate ion.

6. A fabrication method of a solid electrolytic capacitor comprising steps of:

forming a dielectric layer by anodizing an anode employing titanium;
forming an electrolyte layer on said dielectric layer; and
forming a cathode layer on said electrolyte layer; wherein
said step of forming the dielectric layer comprises: a first step of anodizing said anode in an aqueous solution containing fluoride ion; and a second step of anodizing the anode after the first step in the aqueous solution containing at least one ion selected from a group consisting of phosphate ion, borate ion, sulfate ion, and tungstate ion.

\* \* \* \* \*